Nov. 10, 1964   D. E. DIEHL ETAL   3,156,035
METHOD OF MAKING A GLASS LINED PIPE JOINT
Filed July 20, 1959   2 Sheets-Sheet 1

INVENTORS
DONALD E. DIEHL
HERBERT F. YOUNG
BY

ATTORNEYS

Nov. 10, 1964  D. E. DIEHL ETAL  3,156,035
METHOD OF MAKING A GLASS LINED PIPE JOINT
Filed July 20, 1959  2 Sheets-Sheet 2

INVENTORS
DONALD E. DIEHL
HERBERT F. YOUNG
BY
ATTORNEYS

United States Patent Office 3,156,035
Patented Nov. 10, 1964

3,156,035
METHOD OF MAKING A GLASS LINED PIPE JOINT
Donald E. Diehl, Rochester, and Herbert F. Young, West Webster, N.Y., assignors to Pfaudler Permutit, Inc., Rochester, N.Y., a corporation of New York
Filed July 20, 1959, Ser. No. 828,344
4 Claims. (Cl. 29—157)

This invention relates to methods for joining pipe, and more particularly to a method for joining glass-lined metallic pipe, one object being a provision of a more satisfactory method for joining pipe of this nature.

Glass-lined pipes are frequently used in the chemical process and other industries because of their corrosion resistant properties. Such pipe, may be broadly described as comprising an outer shell of steel or other suitable metal, combined with an interior lining of suitable chemically resistant grade of glass. The outer shell of such pipes serves to withstand the mechanical stresses while the interior glass lining has all the smooth surface, corrosion resistance, and other desirable properties of laboratory glassware. This combination of virtues makes this particular type of pipe desirable for many chemical process applications.

In spite of the inherent virtues of this type of pipe, such pipe has heretofore not been as widely applied in the chemical process industries as its desirable properties would indicate because of several drawbacks. One of the most important of these is the difficulty heretofore encountered in joining such glass pipe, and, for this reason, the provision of an improved method of joining such pipe is a principal object of this invention.

In order to get the full advantage from the glass lining of such a pipe, it is necessary that any joints be so designed that the material flowing through the pipe is not allowed to come into any contact with any of the outer metallic portions thereof. For this reason, the provision of the pipe joint which effectively isolates the material flowing in the pipe from the outer metallic portions of the pipe is another object of this invention.

The provision of effective leak-proof pipe joints requires the provision of a flat gasket seating area of sufficient size to form an effective seal. The provision of a joint wherein the glass is deformed to form an enlarged planar gasket seating area is another object of this invention.

In the use of such glass-lined pipe in the chemical and other process industries, the piping is often assembled in the field. Such field assembly necessitates the cutting and fitting of sections of pipe in order to fabricate the desired piping layout. However, difficulty has heretofore been encountered in the cutting and joining of glass-lined pipe in the field. The cutting of such pipe requires a cutting means that will not only cut the outer metallic pipe, but will also cut the inner glass lining. While this alone poses no particularly difficult problems, it has been found that the cutting of the pipe often chips or cracks the glass lining adjacent to the area of the cut. These chips and cracks destroy the gasket seating area and may provide means whereby the contents of the pipe can come into contact with the outer metallic lining. For this reason, it is desirable to provide a method for cutting and joining pipe of this type wherein any damage to the inner glass lining is repaired subsequent to the cutting operation, and the provision of such a method of forming joints in glass-lined pipe is another object of this invention.

Other objects and advantages of this invention will be particularly set forth in the claims and will be apparent from the following description, when taken in connection with the accompanying drawings, in which:

Figure 1:
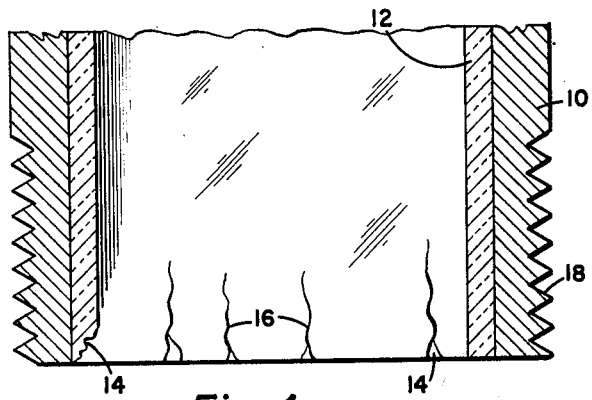
FIG. 1 is a fragmentary, cross-sectional view of a portion of glass-lined pipe showing the end portion after it has been cut and threaded.

The method of forming a joint in glass-lined pipe comprising this invention, and herein described for purposes of illustration, may be broadly described as comprising steps for cutting and threading the pipe, a means for repairing damage to the glass lining adjacent to the cut and at the same time causing a slight enlargement in the glass lining to serve as a gasket flange, and means for fastening the ends of pipe prepared as described above in order to form a completed pipe joint.

Referring now to the drawings, glass-lined pipe, generally may be described as comprising an outer cylindrical metallic shell 10 containing an inner glass lining 12 which is generally under slight compression which was imposed during the manufacture of the pipe. In making plant layouts using such pipe, it is generally desired to cut and fit the lengths of such pipe in the field; that is, at the situs of use in order to insure that all the sections of piping will fit in the proposed plant layout.

It has been found that when such pipe is cut, either by means of a saw capable of cutting both metal and glass, or by means of an abrasive wheel, the ends of the glass lining adjacent to the cut in the pipe are often chipped as shown at 14 or cracked as shown at 16 (FIG. 1). These imperfections in the lining make it impossible to make tight, corrosion resistant joints as required for installations handling corrosive and other fluids which may not be allowed to contact the outer metallic shell 10 of the pipe.

The means of joining the pipe as described herein, which may be carried out in the field, consists of the following steps. The pipe is first cut to proper length by means of any of the known cutting techniques such as the use of a saw or abrasive cutoff wheel which is effective in cutting both the metallic outer shell and the inner glass shell. This step is well known in the art and need not be further described in this place. The only caution that need be introduced at this point is that the outer metallic shell must be of the exact length required for the particular piping layout. A suitable thread 18 is then applied to the end of the pipe in the usual manner.

Figure 2:
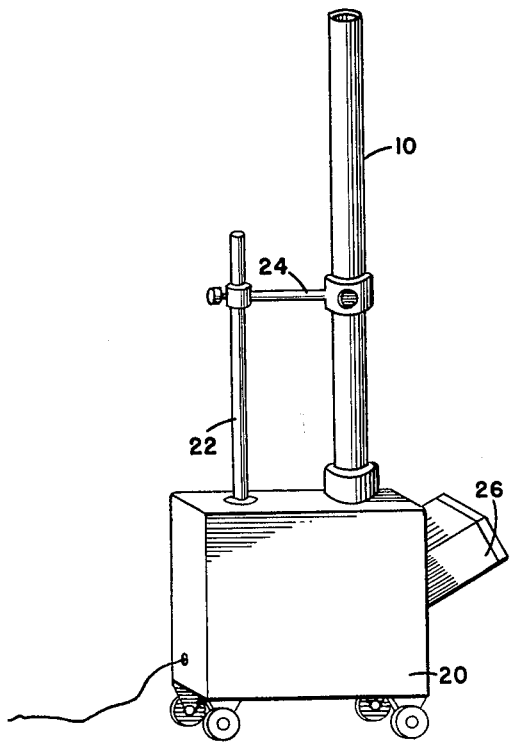
FIG. 2 is a side elevational view of a portable furnace showing a section of pipe in position for treatment.

After the pipe has been cut and threaded as described above, it is often found that the glass lining adjacent to the cut area is chipped and cracked. The cut end of the pipe is therefore inserted in a small portable muffle furnace 20 (FIG. 2), of the type well known in the trade. This furnace must be constructed with the axis of the heating chamber oriented in a substantially vertical direction and has an opening in the top for the insertion of the end of the pipe. A suitable vertical standard 22 and a clamp 24 are provided for supporting the pipe in vertical position. An observation window 26 is preferably included, so that the end of the pipe may be observed during the heating operation. This furnace may be any of the known varieties, and may be fired by gas or electricity as is well known in the art.

Figure 3:
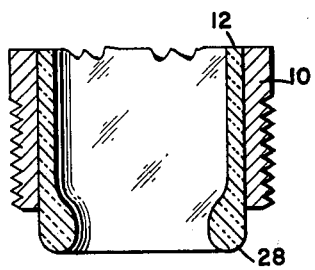
FIG. 3 is a fragmentary, cross-sectional view of the pipe of FIG. 1 after being subjected to a temperature sufficiently elevated to cause the glass lining to soften and sag slightly.

The cut end of the pipe is heated in the furnace as described above while oriented in a vertical position with the cut end lowermost. The temperature in the furnace is then raised to the softening point of the glass lining in the pipe. As the glass lining softens, it tends to sag or flow downwardly forming itself into a cross-sectional shape closely approximating that of a drop of water or other fluid suspended from the end of a tube. This is clearly illustrated at 28 in FIG. 3 showing the glass lining which has sagged downwardly and started to run out of the end of the pipe. This fusion and softening of the glass lining at the same time serves to "heal" or repair any cracks 16 or chips 14 that may have been formed in the glass lining during the cutting operation. At the same time, it provides an increased cross-section of glass adjacent to the cut end of the metallic pipe, as shown in the drawing. After this heating step, wherein the glass-lined pipe has been maintained at a temperature sufficiently elevated to cause the glass to soften and flow, the pipe is removed from the furnace. As soon as the pipe has cooled sufficiently to cause the glass to harden to a non-flowing consistency, the pipe may be restored to a horizontal position and allowed to cool. The pipe is now ready for the third step in the fabrication of the joint.

Figure 4:
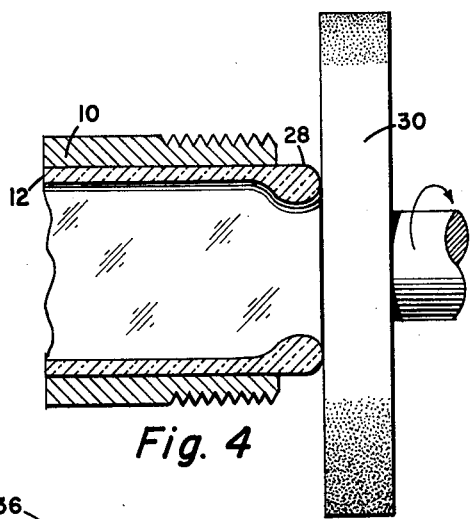
FIG. 4 is a fragmentary cross-sectional view of the pipe of FIG. 3 showing the method whereby the sagging portion of the glass lining is ground away.

The third step in the formation of the fabrication of the pipe joint according to this invention comprises the grinding off of the excess glass which projects from the end of the pipe in order to produce a square, flush end on the pipe for forming the joint. This is accomplished by means of an ordinary fine abrasive wheel 30 driven by any means of suitable rotary hand tool such as is well known in the art. Wheel 30 is held against the end of the pipe as illustrated in FIG. 4, and power is supplied thereto to grind off the glass 28 projecting from the end of the pipe until it is flush with the cut end of the metallic outer shell. When this step is completed, the pipe appears as shown in FIG. 5.

Figure 5:
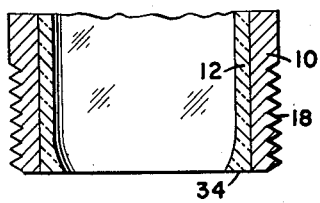
FIG. 5 is a cross-sectional view of the end of the pipe shown in FIG. 4 after the sagging portion of glass has been ground flush with the end of the outer metallic pipe.

It will be observed from FIG. 5 that not only did the heating step described above serve to repair or heal any cracks or chips that may have occurred in the glass lining during the cutting step, but also serves to provide an enlarged gasket seat as shown at 34, for the proper seating of the gasket. The area of gasket seat 34 depends on the degree of sag which was allowed to occur during the heating step described above. In any case, it may be seen that the first two steps described in the joining process as described above serve to provide an enlarged gasket seating area 34 having approximately twice the cross-sectional area of the original glass lining 12.

Figure 6:
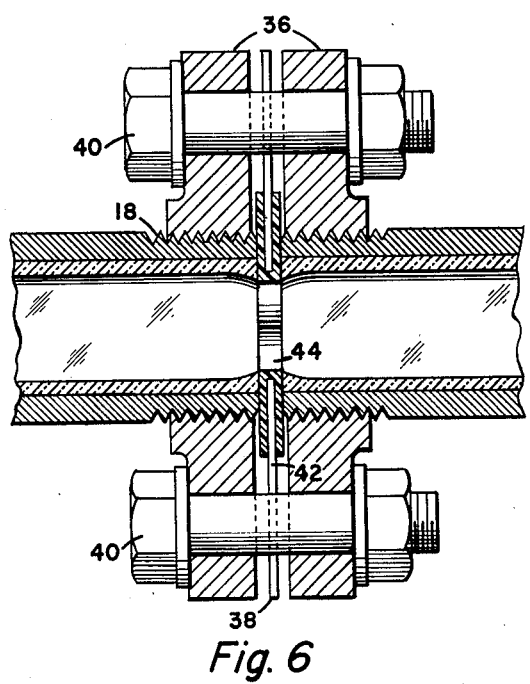
FIG. 6 is a cross-sectional view of the completed pipe joint formed by the method embodying this invention.

When these steps have been completed on the ends of the pipes to be joined, the joint can then be made. A pair of flanges 36 (FIG. 6) are then applied to the threaded ends 18 of the pipes and screwed onto the pipe a sufficient distance to allow the cut ends of the pipe to project slightly therethrough as shown in FIG. 6. A suitable gasket 38 is then set in place between the two ends of the pipes, and bolts 40 are inserted in the holes in the flanges, and the two pipes are then carefully drawn together.

The gaskets which have been found most suitable for use in pipe joints comprising this invention consist of a flat sheet of asbestos 42 or other suitable resilient composition, provided with an insert 44 of a resilient, corrosion resistant plastic. Although any corrosion resistant plastic may be used which will effectively resist the corrosive or solvent action of the fluid to be used in the pipe, we have found that for most purposes a polyflorethylene plastic, such as those available under the trademark "Teflon," is particularly suitable for this purpose. These plastics not only have a very wide range of corrosion resistance, but are sufficiently resilient in order to form a tight joint with gaskets seat 34 when the pipes are drawn together by bolts 40 in flanges 36.

It will thus be seen that the above invention accomplishes its stated objects. The proces herein described may be carried out in the field. The only tools necessary for this are a suitable cutting tool, a threading tool, a small portable electric or gas muffle furnace for heating the end of the pipe, and an ordinary grinding tool for removing the excess glass and providing a smooth gasket contacting face on the cut end of the pipe. The small internal flange formed by the sagging of the glass lining of the pipe provides the necessary gasket contacting area in order to provide a tight leak proof joint between adjacent pipes. The small internal flange formed by the sagging glass is not of sufficient size to provide significant internal resistance to flow in the pipe, but is sufficient to provide the necessary gasket face in order to insure a tight joint. Any damage that has occurred to the glass lining of the pipe during the cutting and threading operations is effectively repaired by the heating step prior to the formation of the joint.

While there has been shown and described the preferred form of mechanism of this invention it will be apparent that various modifications and changes may be made therein, particularly in the form and relation of parts, without departing from the spirit of this invention as set forth in the appended claims.

We claim:

1. The method of cutting and fitting glass-lined pipe, comprising the method steps of cutting said pipe, supporting said pipe in substantially vertical orientation with the cut end lowermost, heating the end of said pipe while in vertical orientation to the softening temperature of the glass lining, maintaining said pipe at said elevated temperature until the glass lining softens and sags out of the end of the pipe to form an enlarged, annular projection extending therebelow, cooling said pipe, and grinding said projection to form a flat gasket seating surface.

2. The method of cutting and fitting a glass-lined pipe comprising the method steps of cutting said pipe, externally threading the end of said pipe, supporting said pipe in a substantial vertical orientation with the cut end lowermost, heating the end of said pipe while in vertical orientation to the softening temperature of the glass lining, maintaining said pipe at said elevated temperature till the glass lining softens and sags out of the end of said pipe to form an enlarged, annular projection extending therebelow, cooling said pipe, and grinding said projection flush with the end of said pipe to form a flat gasket seating surface.

3. The method of cuting and joining glass-lined pipes, comprising the method steps of cutting said pipes, supporting said pipes in substantial vertical orientation with the cut end lowermost, heating the ends of said pipes while in vertical orientation to the softening temperature of the glass lining, maintaining said pipes at said elevated temperature until the glass lining softens and sags out of the end of said pipes to form an enlarged annular projection extending therebelow, cooling said pipes, grinding said projections to form flat gasket seating surfaces, inserting a resilient gasket between the opposing gasket seating surfaces on said pipes, and drawing said pipes together to form a tight, leak-proof joint.

4. The method of cutting and joining glass-lined pipes, said method comprising the steps of cutting said pipes externally threading the cut ends of said pipes, supporting said pipes in substantially vertical orientation with the cut and threaded ends lowermost, heating the cut and threaded ends of said pipe while in vertical orientation to the softening temperature of the glass lining therein, maintaining said pipes at said elevated temperature until the glass lining softens and sags out of the end of said pipes to form enlarged, annular projections extending therebelow, cooling said pipes, grinding said projections to form flat gasket seating surfaces, applying threaded flanges to the threaded ends of said pipes, inserting a resilient gasket between the opposing gasket seating surface of said pipes, and drawing said pipes together by means of bolts engaging said flanges to form an impervious joint between said pipes.

References Cited in the file of this patent

UNITED STATES PATENTS

| | | |
|---|---|---|
| 171,440 | Smith | Dec. 21, 1875 |
| 720,655 | Bard | Feb. 17, 1903 |
| 947,130 | Rogers | Jan. 18, 1910 |
| 2,114,869 | Bol et al. | Apr. 19, 1938 |
| 2,189,860 | Frei | Feb. 13, 1940 |
| 2,290,333 | Johnson | July 21, 1942 |
| 2,308,307 | Robinson | Jan. 12, 1943 |
| 2,333,186 | Landesman et al. | Nov. 2, 1943 |
| 2,385,071 | Geier | Sept. 18, 1945 |
| 2,822,646 | Krefft | Feb. 11, 1958 |
| 2,880,553 | Carson | Apr. 7, 1959 |
| 2,888,783 | Turnbull | June 2, 1959 |

FOREIGN PATENTS

| | | |
|---|---|---|
| 32,598 | Austria | Apr. 10, 1908 |